United States Patent [19]
Weis et al.

[11] Patent Number: 5,803,556
[45] Date of Patent: Sep. 8, 1998

[54] HYDRAULIC BRAKE SYSTEM WITH SKID CONTROL

[75] Inventors: Helmut Weis, Bad Vilbel; Klaus-Diether Fischer, Lorsch; Peter Volz, Darmstadt; Dalibor Zaviska, Eschborn/Ts; Paul Linhoff, Eppershausen; Ralf Kaiser, Mainz-Amoneburg, all of Germany

[73] Assignee: ITT Automotive Europe GmbH, Frankfurt, Germany

[21] Appl. No.: 687,401

[22] PCT Filed: Jan. 25, 1995

[86] PCT No.: PCT/EP95/00264

§ 371 Date: Nov. 20, 1996

§ 102(e) Date: Nov. 20, 1996

[87] PCT Pub. No.: WO95/21081

PCT Pub. Date: Aug. 10, 1995

[30] Foreign Application Priority Data

Feb. 3, 1994 [DE] Germany ............ 44 03 295.1

[51] Int. Cl.⁶ ................ B60T 8/36; B60T 8/50; B60T 8/38
[52] U.S. Cl. .............. 303/119.2; 137/614.19; 137/614.21; 251/129.02; 303/113.1; 303/900
[58] Field of Search ............. 303/119.2, 119.1, 303/113.1, 900, 901, 117.1, 116.1, 116.2, 87, DIG. 1, DIG. 2; 251/120, 121, 122, 117, 129.01–129.22; 137/501, 614.21, 614.19, 613, 596.17, 495, 509

[56] References Cited

U.S. PATENT DOCUMENTS

| 4,844,559 | 7/1989 | Harrison | 251/129.02 |
|---|---|---|---|
| 5,076,538 | 12/1991 | Mohr et al. | 251/129.02 |
| 5,370,450 | 12/1994 | Volz et al. | 303/119.2 |
| 5,445,447 | 8/1995 | Farr et al. | 303/117.1 |
| 5,647,644 | 7/1997 | Volz et al. | 303/113.1 |
| 5,664,849 | 9/1997 | Burgdorf et al. | 303/900 |
| 5,683,150 | 11/1997 | Burgdorf et al. | 303/119.2 |

FOREIGN PATENT DOCUMENTS

| 0181643A2 | 5/1986 | European Pat. Off. . |
|---|---|---|
| 0317305A3 | 5/1989 | European Pat. Off. . |
| 2680742A1 | 3/1993 | France . |
| 3725810A1 | 2/1989 | Germany . |
| 3934771C1 | 3/1991 | Germany . |
| 4137123A1 | 5/1993 | Germany . |
| 4236482A1 | 5/1994 | Germany . |
| 2252140 | 7/1992 | United Kingdom . |

OTHER PUBLICATIONS

International Search Report.

German Search Report.

PCT Application Serial No. 95/13945 Dated May 26, 1995.

PCT Application Serial No. 95/09098 Dated Apr. 6, 1995.

PCT Application Serial No. 91/18774 Dated Dec. 12, 1991.

*Primary Examiner*—Douglas C. Butler
*Attorney, Agent, or Firm*—J. Gordon Lewis; Thomas N. Twomey

[57] ABSTRACT

A hydraulic brake system with skid control is provided with digitally switchable inlet and outlet valves. An inlet valve includes a variable flow area valve control that is actuated as a function of differential pressures in order to reduce the valve noise.

12 Claims, 7 Drawing Sheets

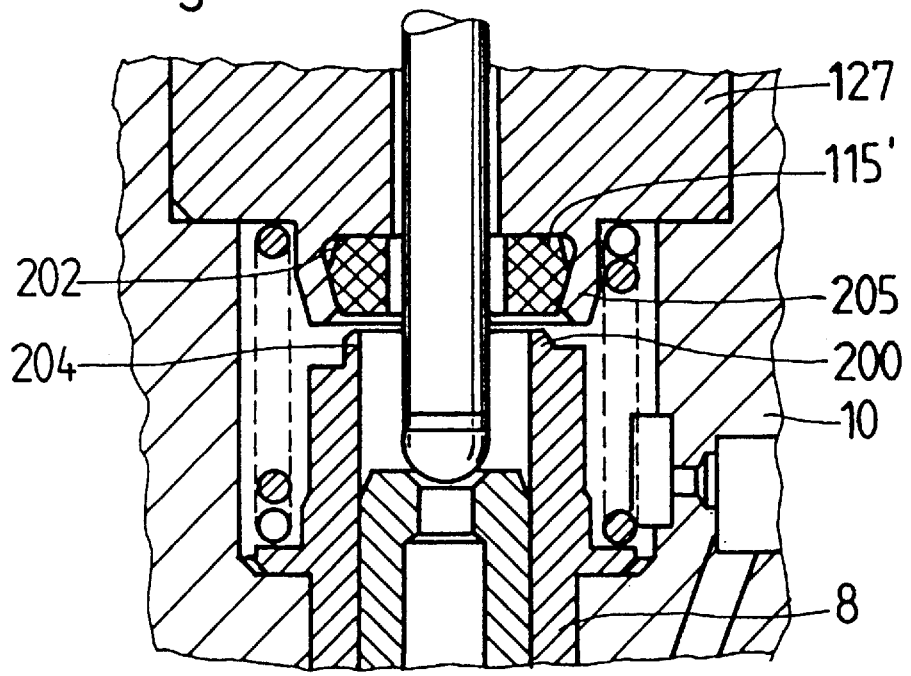
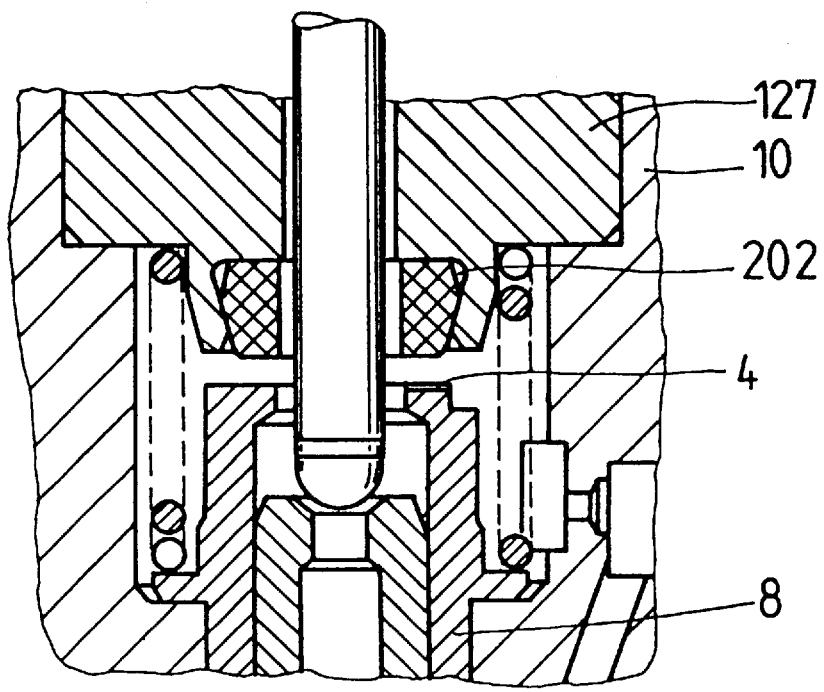

HYDRAULIC BRAKE SYSTEM WITH SKID CONTROL

FIELD OF THE INVENTION

The invention pertains to a hydraulic brake system with skid control and more specifically to such a system having an annular piston controlling a passage with a selectable flow area disposed in a main pressure line between an inlet valve and a wheel brake.

BACKGROUND OF THE INVENTION

The discontinuous pressure medium control in skid-controlled brake systems produced by means of digitally switchable (on-off) inlet and outlet valves leads to an undesirable sound emission due to the impulse-like pressure profile.

Known solutions for arranging the annular piston provided with the switchable or selectable flow area as well as the details in the magnetic inlet valve which correspond to the annular piston require an additional structural simplification in order to attain the simplest and smallest design of the inlet valve.

SUMMARY OF THE INVENTION

The invention is based on the objective of disclosing solutions for miniaturizing the inlet valve while maintaining the same control arrangement of the brake system disclosed in the main application, with said solutions being realized inexpensively and without limiting the proper function of the inlet valve.

The annular piston used to switch or select flow area is guided in the valve support concentric to the valve closing element of the inlet valve, namely inside of an annular space, and includes a restrictive flow passage. Alternatively, the restrictive flow passage may be integrated into the magnetic core separately of the annular piston.

In this way, the annular space which originally accommodated an annular filter and the valve closing element simultaneously serves for integrating the annular piston and the restrictive passage such that the exterior dimensions of the valve support as well as the dimensions of the graduated bore of the valve receptacle body can be maintained. In addition, the annular region between the valve receptacle body and the valve support can be used for accommodating the annular filter such that the filter surface for filtering the fluid that, among other things, also flows between the wheel brake and the return collar is advantageously increased.

Additional characteristics, advantages and application options of the invention are described below with reference to several embodiments.

BRIEF DESCRIPTION OF THE DRAWINGS

FIG. 6 is an enlarged partial view of a fourth alternative embodiment of the inlet valve of FIG. 1.

FIG. 7 is an enlarged partial view of a fifth alternative embodiment of the inlet valve of FIG. 1.

DETAILED DESCRIPTION OF PREFERRED EMBODIMENTS

Figure 1:
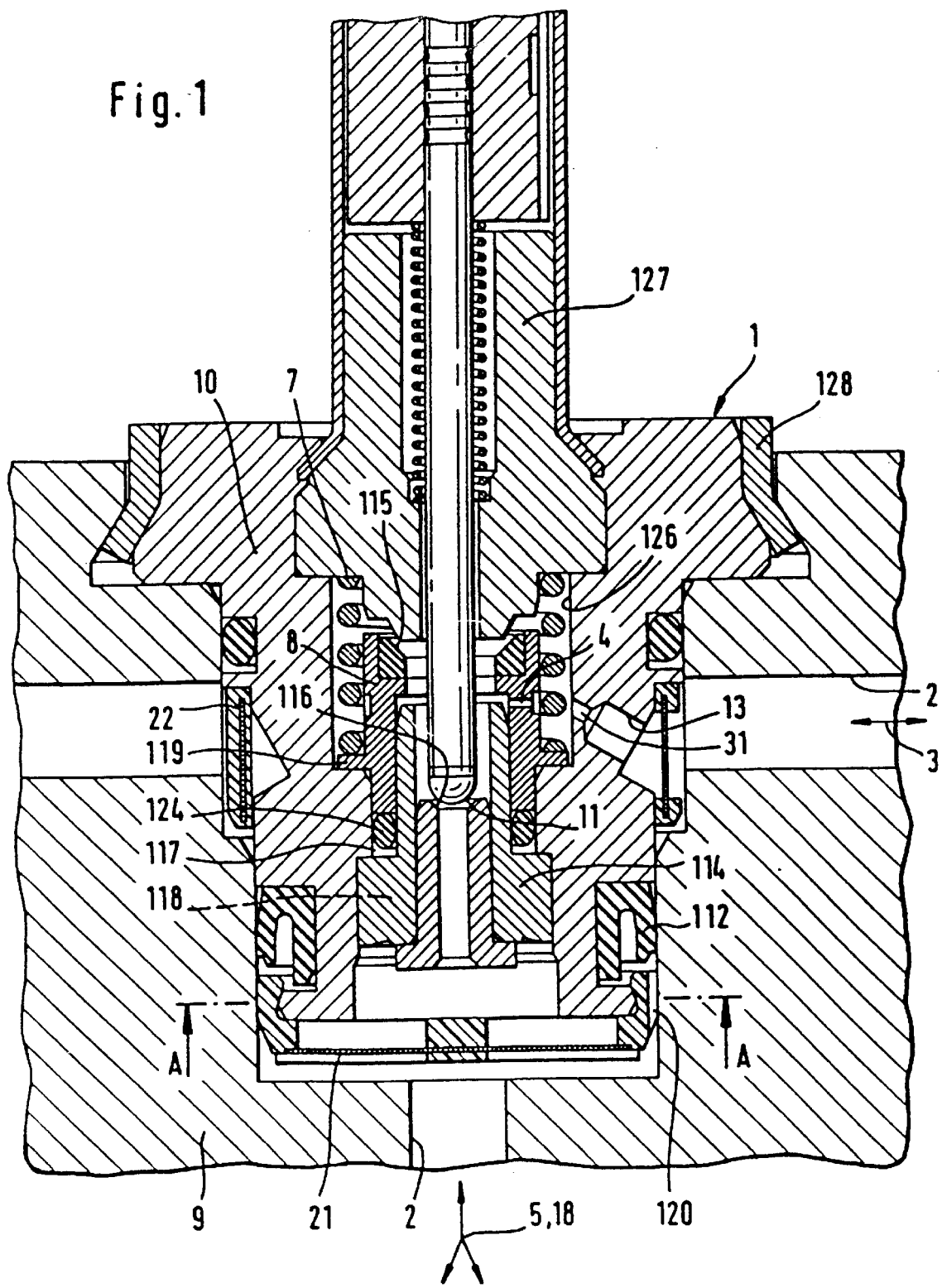
FIG. 1 is an enlarged partial view of an inlet valve with the arrangement according to the invention of the annular piston in the region of the valve closing element.

FIG. 1 shows one constructive embodiment of the entire inlet valve 1. The inlet valve 1 comprises a valve support 10 that contains the valve closing element 11 and the channel for the main pressure line 2 which originates at the brake pressure transducer 5 and the auxiliary pressure pump 18. The valve support 10 is preferably integrated into a valve receptacle body 9 in the form of a cartridge in the form of, for example, a screw-in cartridge, or a caulked cartridge, or a cartridge with an expanding ring. In the valve fastening system shown, the valve support 10 is fastened within the conically tapered outer region of the valve receptacle body 9 by means of an expanding ring 128, with the opening of the aforementioned valve receptacle body being provided with a conical undercut for accommodating the expanding ring 128. The tightness of the valve support 10 in the valve receptacle body 9 is ensured by a seal arranged underneath the conical valve support 10. A pressure medium connection between the main pressure line 2, connected to the brake pressure transducer 5 and the auxiliary pressure pump 18, and the annular piston 8 is realized by means of a plate filter 21 clamped onto a projection of the valve support 10 and the valve closing element 11 that is open in its normal position. From there, the pressure medium is conveyed to a fixed [diaphragm] diameter passage 31 that is arranged in the valve support 10 and used for improving the quality of the ABS control via the open annular gap on the magnetic core 127 and, to a lesser extent, the passage bore, in the direction of the annular filter 22 arranged in front of the connection leading to the wheel brake 3.

Due to a lateral passage or bore 4 in the wall of the annular piston, the annular piston 8 fulfills the function of the switchable restrictive flow area passage. This annular piston 8 is guided in the annular- space 126 in axially movable fashion on the reduced-diameter projection of the rotationally symmetric central body 114 that comprises the valve seat 116. The annular piston 8 is supported under the influence of a compression spring 7 on the bore step of the annular space 126 in the valve support 10 by its outer collar 119 which acts as a limit stop. The annular piston 8 essentially has the shape of a sleeve that is provided with a funnel-shaped rubber seal portion 115' on its end face opposite the magnetic core 127. The rubber seal portion 115' is arranged opposite to the conical end face region of the magnetic core 127, with the seal portion 115' and the end face region of the magnetic core 127 together defining a valve seat 115. The conical seal portion 115' may, if so required, also be realized in the form of a flat metallic seal or an O-ring that is set into the end face region of the annular piston 8.

A ring seal 124 that prevents an overflow of the pressure medium from the brake pressure transducer 5 toward the wheel brake 3 in the closed position of the inlet valve 1 is situated on the face side of the annular piston 8 that faces away from the magnetic core 127. The rotationally symmetrical central body 114, the projection of which extends into the interior, is pressed into the stepped bore of the valve support 10 and, if so required, caulked within the end face region. In the embodiment shown, the valve seat 116 is pressed into the bore of the central body 114 which extends coaxially to the valve closing element 11, namely in the form of a stepped sleeve part.

An annular groove situated on the outer circumference of the valve support 10 at the elevation of the central body 114 accommodates a sealing collar 112 that seals in the direction of the wheel brake 3 and, via an annular filter 22 arranged between the valve support 10 and the valve receptacle body 9 as well as at least one lateral recess 120 on the plate filter 21, it produces a pressure medium connection between the wheel brake 3 and the brake pressure transducer 5 or the auxiliary pressure pump 18, respectively.

Figure 2:
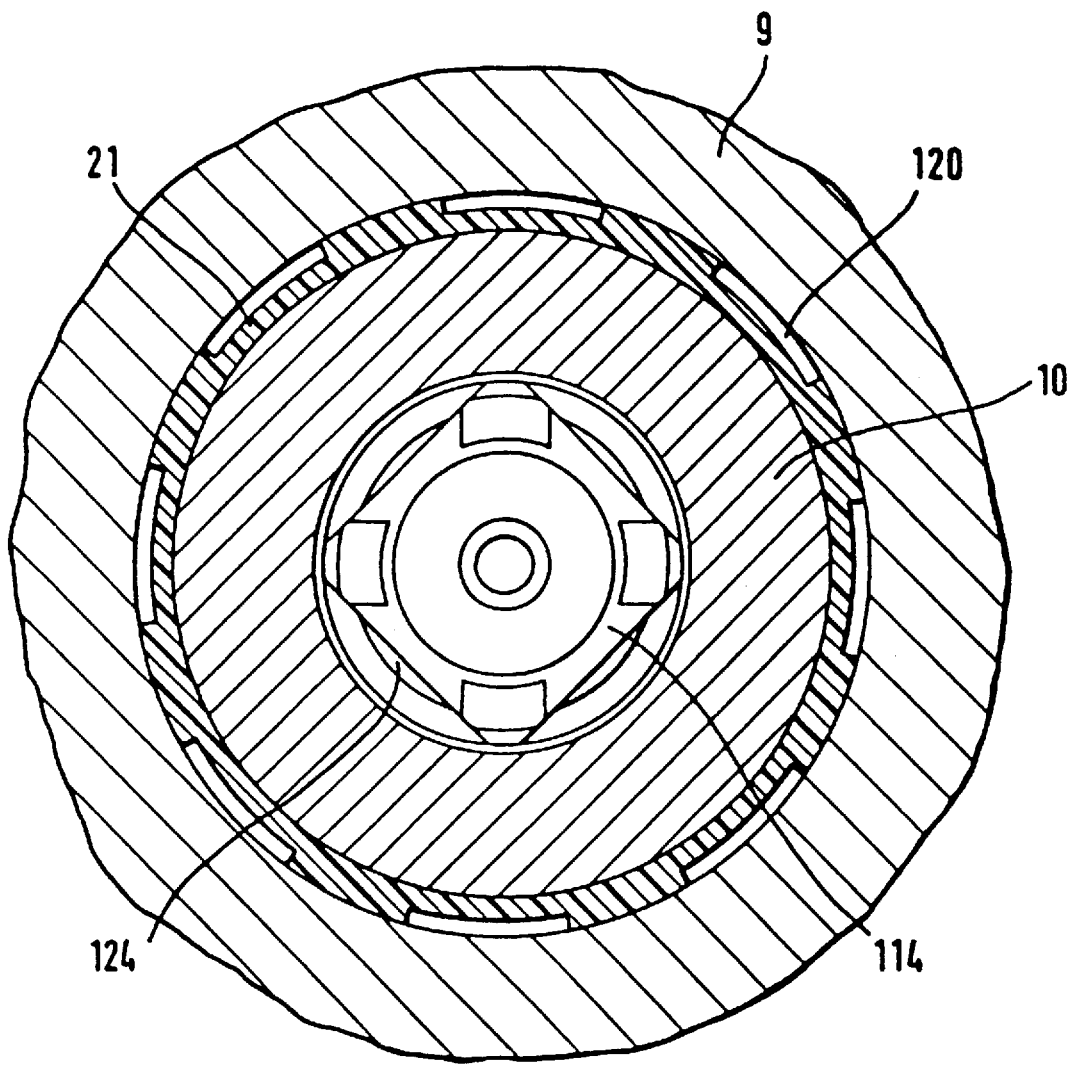
FIG. 2 is an enlarged cross section through the inlet valve according to FIG. 1 at the location A—A of the valve support.

FIG. 2 shows a sectioned top view of the inlet valve 1 shown in FIG. 1 at the location A—A. This figure shows that, due to its realization in the form of a square profile, the central body 114 has correspondingly large pressure medium passages situated opposite to the inner wall of the valve support 10, and extending in the direction of the ring seal 124 arranged in front of the annular piston 8. The plane of section extends through the lower end section of the valve support 10, on which the plate filter 21 is clipped. The plate filter 21 comprises several recesses 120 that are distributed over its circumference and allow the passage of the pressure medium that arrives from the direction of the sealing collar 112. All elements situated in the plane of section A—A consequently are situated in a rotationally symmetrical and coaxial arrangement.

Figure 3:
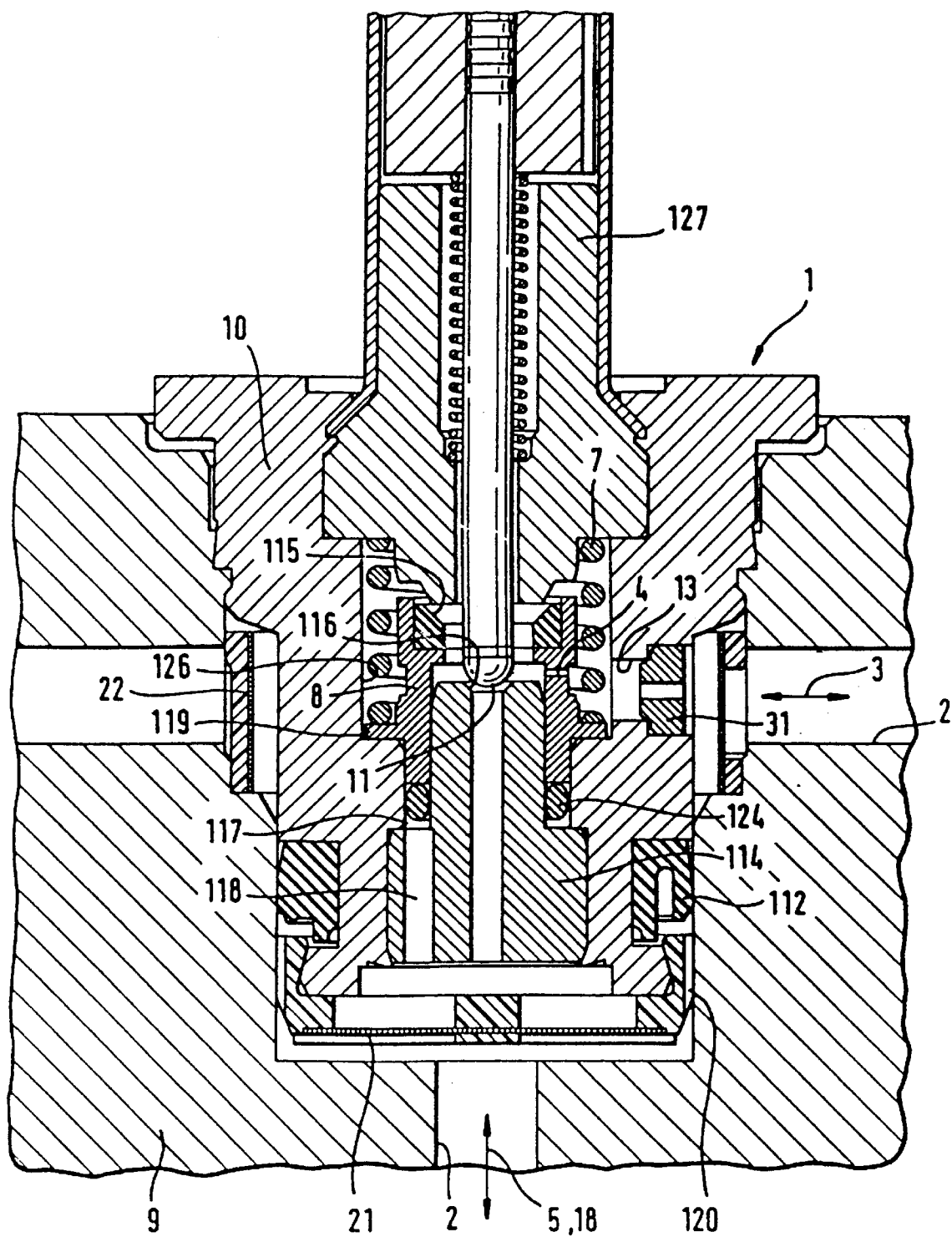
FIGS. 3 is an enlarged partial view of a first alternative embodiment of the inlet valve of FIG. 1.

In contrast to FIG. 1, FIG. 3 shows an enlarged representation of a valve seat 116 that is integrated into the central body 114 in the form of a homogeneous component. Consequently, the symmetric arrangement of an additional, sleeveshaped insert that comprises the valve seat 116 and was described previously in connection with FIG. 1 is eliminated. Only one aperture 118 in the central body 114 is provided for charging the ring seal 124 arranged on the annular piston 8 with pressure, with said aperture having correspondingly large dimensions and being inexpensively realized in the form of a bore. In order to precisely adjust the quantity of the pressure medium flowing to the wheel brake 3 during the ABS operation, a fixed diameter passage 31 is additionally pressed into the valve support 10 in the form of an insert, namely into the lateral bore 13 of the valve support 10 which hydraulically connects the annular space 126 with the wheel brake 3. If so required, the fixed diameter passage according to FIG. 1 can be replaced with a lateral bore that is produced by means of calibrated precision drilling. The valve support 10 is held in the valve receptacle body 9 by means of a self-tapping fastening arrangement, i.e., the ring seal shown in FIG. 1 can be eliminated.

Figure 4:
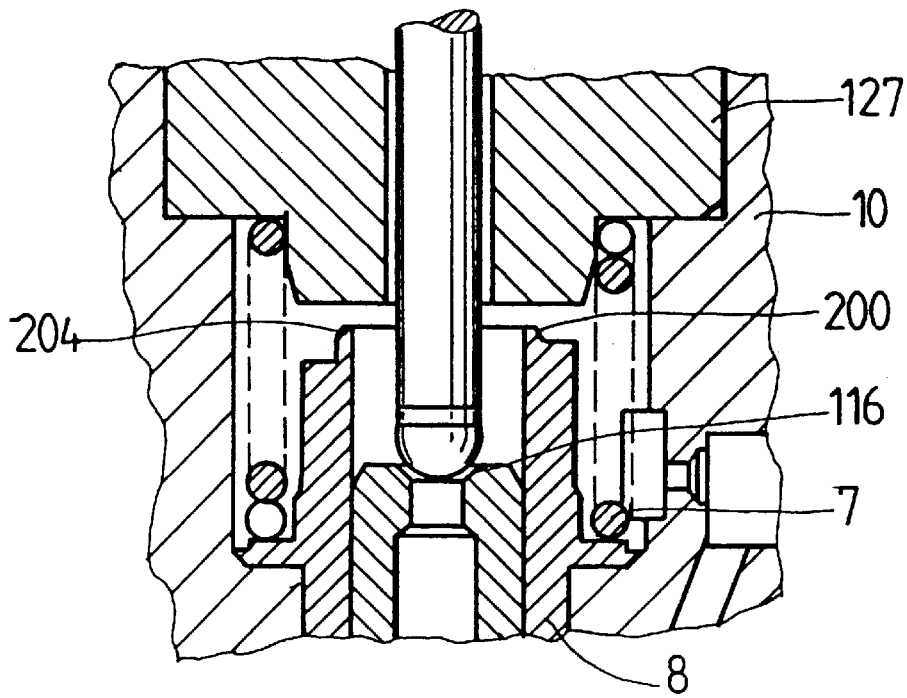
FIG. 4 is an enlarged partial view of a second alternative embodiment of the inlet valve of FIG. 1.

FIG. 4 shows an enlarged detail of the inlet valve 1. The end face of the magnetic core 127 which together with the end face of the annular piston 8 which forms the seal seat 115 are both exclusively realized in the form of flat metallic seals, with the portion of the seal seat 115 on the annular piston 8 being realized in the form of a blade-shaped circumferential web 200 that simultaneously fulfills the function of the lateral bore 4 with a notch 204. This notch can be inexpensively manufactured, for example, by milling, punching or eroding and, as compared to bores, prevents soiling or clogging due to its peripheral arrangement. A self-cleaning effect of the notch 204 is inevitably attained during the return movement of the annular piston 8 which releases the seal seat 115.

Figure 5:
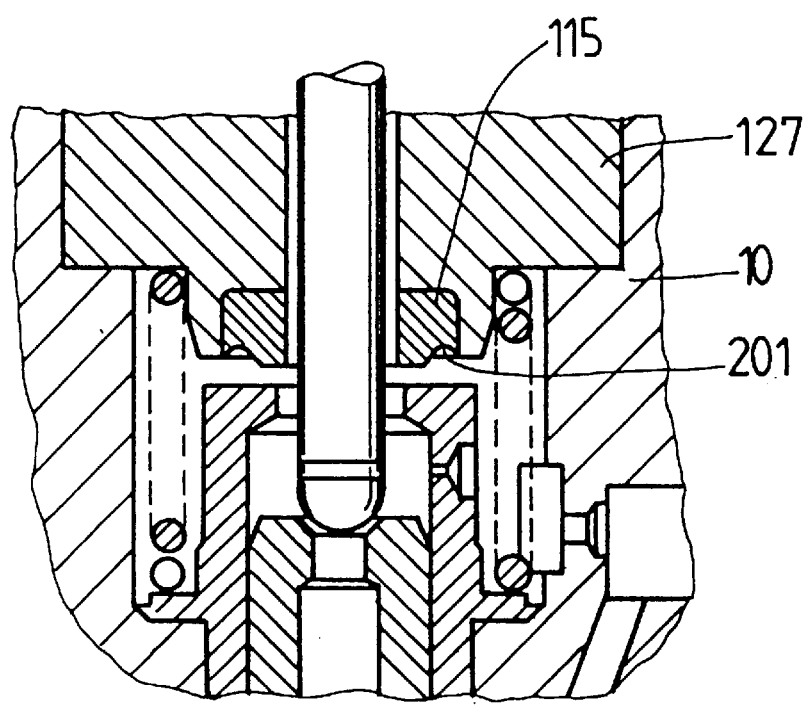
FIG. 5 is an enlarged partial view of a third alternative embodiment of the inlet valve of FIG. 1.

FIG. 5 shows an enlarged representation of an alternative embodiment for sealing the annular piston by means of a combination of a metallic seal seat 115 on the annular piston 8 and an elastically deformable seal seat 115 on the magnetic core 127. The seal seat 115 on the magnetic core 127 is realized in the form of a ring seal and manufactured of PTFE or EPDM plastic material. In order to reduce the hydraulically charged seal seat surface, the plastic seal seat 115 comprises a round-bottom annular groove 201.

According to FIG. 6, the seal portion 115' for the seal seat 115 on the annular piston 8 is clamped in the magnetic core 127, by pressing the annular web 205 that protrudes at the end face of the magnetic core 127 inward after inserting the seal. The seal portion 115' preferably is manufactured of polytetrafluoroethylene (PTFE) and faces the annular seal seat 115 on the annular piston 8 with its free seal seat surface. A lateral passage 204 is realized in the form of a notch on the annular seal seat 115.

The seal seat 115 of the annular piston 8 according to FIG. 7 primarily differs from the one used in the embodiment shown in FIG. 6 due to its large-surface, planar seal seat, i.e., the cross section of the notched, groove-shaped passage 4 is not reduced during the insertion of the elastic portion of seal 115. The elastic portion of seal 115 as well as its fastening arrangement in the magnetic core 127 correspond to the previously described embodiment according to FIG. 6.

Figure 8:
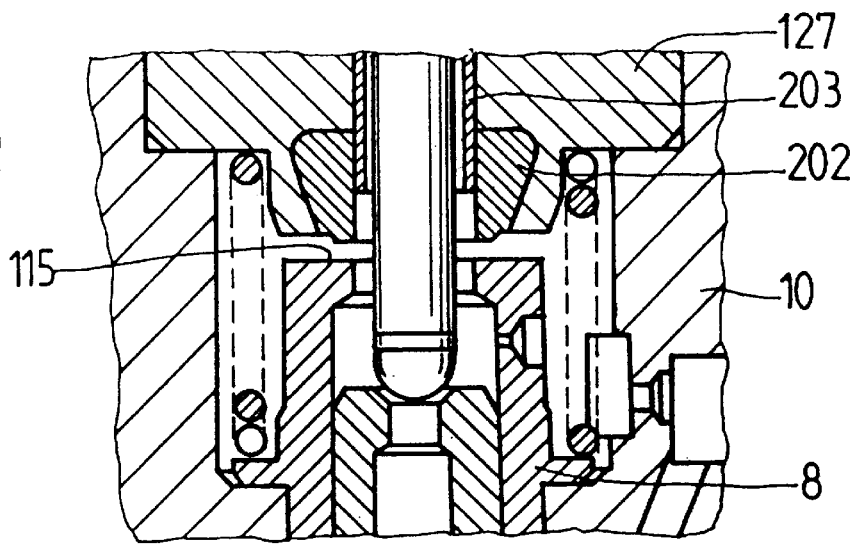
FIG. 8 is an enlarged partial view of a sixth alternative embodiment of the inlet valve of FIG. 1.

Another practical option for fastening the plastic seal 115 on the magnetic core 127 is shown in FIG. 8. The elastomer sealing material is injected into the hollow space that is realized in the magnetic core 127 in the form of an undercut 202 and positively held therein by the sleeve 203 that extends into the hollow space of the elastomer sealing element coaxially to the valve lifter. The sleeve 203 is inserted into the stepped bore of the magnetic core 127 from the top and held on the bore step at its collar by the compression spring arranged on the magnetic armature.

Figure 9:
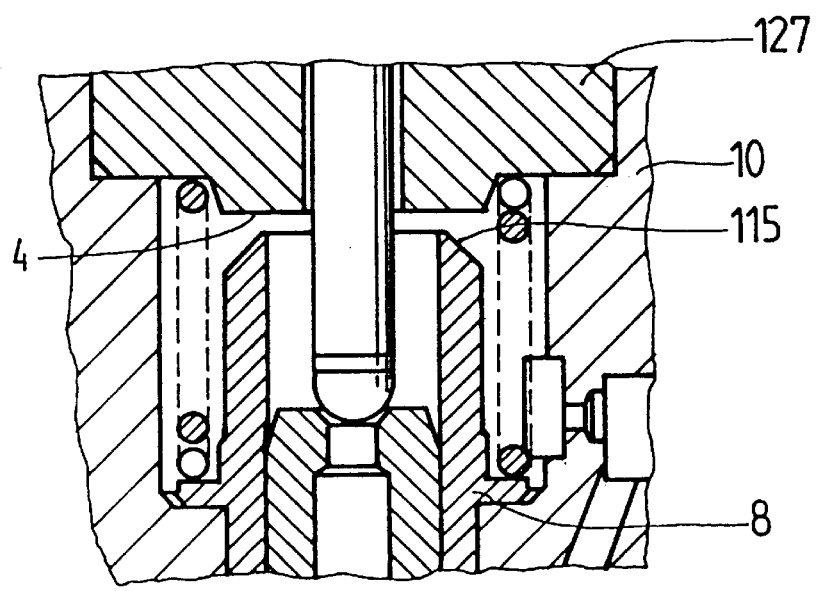
FIG. 9 is an enlarged partial view of a seventh alternative embodiment of the inlet valve of FIG. 1.
Figure 10:
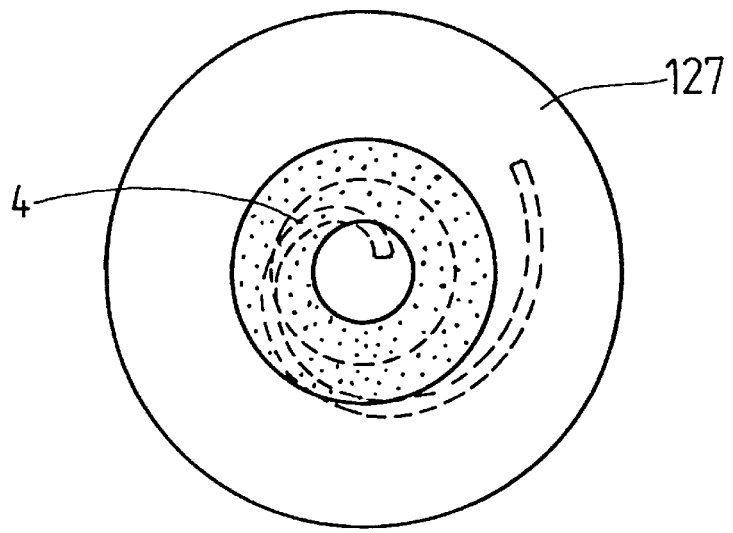
FIG. 10 is a sectional view in an axial direction of the embodiment illustrated in FIG. 9.

In FIG. 9, the seal seat 115 is exclusively formed of metallic sealing surfaces. One peculiarity of this embodiment can be seen in the fact that the lateral passage 4 consists of a groove that is arranged in the end face of the magnetic core 127 and extends in the shape of a spiral. This groove may, for example, be manufactured in precise and inexpensive fashion by means of machining, e.g., with a lathe tool. The spiral groove is illustrated in its entirety in FIG. 10, which shows a plan view along the plane of section A indicated in FIG. 9.

Figure 11:
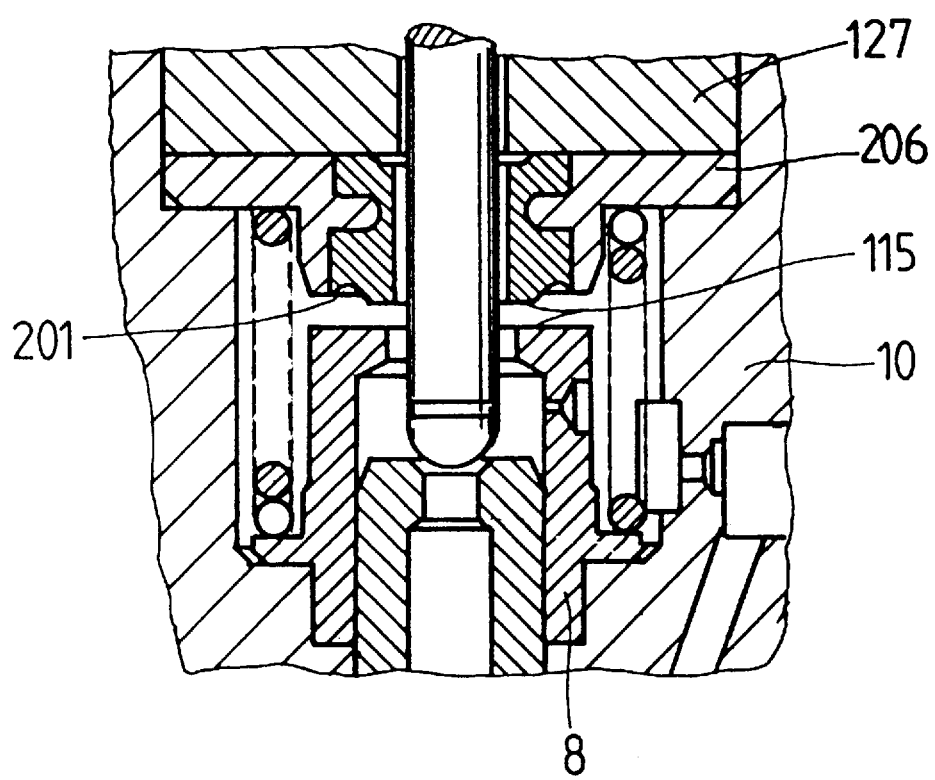
FIG. 11 is an enlarged partial view of an eighth alternative embodiment of the inlet valve of FIG. 1.

FIG. 11 shows an alternative option for fastening the elastomer sealing element inside of a holding part 206 that is separately positioned between the magnetic core 127 and the valve support 10. The sealing element is preferably vulcanized into the metallic holding part 206 and additionally secured inside of the holding part by positively acting edges. The essentially disk-shaped holding part 206 allows the assembly in advance of the additional components arranged underneath the holding part and simplifies the adjustment of the valve lifter stroke. The elastomer sealing material is injected on the side that faces away from the seal seat surface such that the formation of a injection burr is prevented within the region of the seal seat 115.

All additional elements shown in FIGS. 3–11 essentially correspond to FIG. 1 with respect to their design and function.

The function of the invention is described below.

During a normal non-skid braking phase, the inlet valve 1 is situated in the open position in which it is not electromagnetically excited. When actuating the brake pressure transducer 5, a dynamic pressure is not built up in the intake of the inlet valve 1 because the valve seat 116 does not cause a decisive throttle or diaphragm effect. Consequently, no noteworthy differential pressure is built up between the valve intake and the valve outlet. The annular piston 8 remains in the normal position shown in the figure in which it adjoins the bore step, i.e., the brake pressure is able to act upon the wheel brake 3 via the valve seat 116 and the annular gap between the annular piston 8 and the magnetic core 127.

When releasing the brake pedal, the brake pressure is decreased in the opposite direction namely in the direction of the brake pressure transducer 5, via the open valve closing element 11 and the sealing collar 112.

If the differential pressure between the valve intake (main cylinder/pump pressure) and the valve output (wheel brake pressure) exceeds a value that is predetermined by the compression spring 7 while the inlet valve 1 is closed and the skid control is active, the annular piston 8 is displaced against the force of the spring due to the resulting pressure exerted upon the ring seal 124 and consequently adjoins the magnetic core 127 in sealed fashion. A pressure medium connection with the wheel brake 3 is only produced via the lateral passage 4 of the annular piston 8. Once the inlet valve 1 opens its regular passage by displacing its valve closing element 11, the fluid conveyed by the operative auxiliary pressure pump 18 reaches the wheel brake exclusively through the [diaphragm] lateral passage 4 in the annular piston 8, with said fluid being decelerated in such a way that the pressure shock and consequently the noise emission are reduced during the subsequently repeated closing of the inlet valve 1. If the differential pressure required for actuating the annular piston 8 is not reached or if the braking process is interrupted, the annular piston 8 is returned into its normal position in which the flow cross section is increased.

We claim:

1. An improved hydraulic brake system with skid control, including a brake pressure transducer that is hydraulically connected to at least one wheel brake via a main pressure line, a return line that is connected to the wheel brake and is hydraulically connected to a pressure medium reservoir, an auxiliary pressure pump that is connected to an auxiliary pressure line and is hydraulically connected to the brake pressure transducer, inlet and outlet valves which are respectively arranged in the main pressure line and the return line, with said inlet and outlet valves both closing and opening a pressure medium passage in the main pressure line and in the return line, and the inlet valve having an annular piston arranged therein operably defining in a first position the pressure medium passage to provide an unobstructed hydraulic connection between the main pressure line and the wheel brake and in a second position together with a magnetic core defining a first valve seat limiting the pressure medium passage to the wheel brake, wherein the annular piston is guided in a valve support concentric to a valve closing element of the inlet valve inside an annular space surrounded by an outer wall, and wherein the improvement comprises:

the annular space being defined by the magnetic core of the inlet valve on a first end and by a central body that is rigidly connected to the housing and accommodates a second valve seat on a second end, with the annular piston being guided in axially movable fashion between the central body that comprises the first valve seat and the outer wall of the annular space.

2. A hydraulic brake system according to claim 1, wherein the first valve seat consists of metallic sealing surfaces on the magnetic core and the annular piston and includes a web-like sealing surface that extends around the circumference of the end face of the annular piston is placed against the end face of the magnetic core.

3. A hydraulic brake system according to claim 2, wherein a notch on the end of the magnetic core serves as the pressure medium passage when the annular piston is in the second position.

4. A hydraulic brake system according to claim 3, wherein the notch on the end face of the magnetic core originates at a through-channel of the magnetic core and extends outward in the shape of a spiral.

5. A hydraulic brake system according to claim 1, wherein a seal of the first valve seat is manufactured of an elastomer material and is provided with an annular groove which reduces the hydraulically charged seal surface.

6. A hydraulic brake system according to claim 5 wherein the elastomer material of the seal seat is fastened in non-positive fashion by means of vulcanizing, pressing, clamping or caulking.

7. A hydraulic brake system according to claim 6 wherein the seal seat is injected into a conically tapered undercut of the magnetic core, and that a sleeve on which the seal seat is nonpositively held is inserted into the undercut.

8. A hydraulic brake system according to claim 1, wherein a seal of the first valve seat is disposed inside of a holding part that is separately positioned between the magnetic core and the valve support.

9. A hydraulic brake system according to claim 1, wherein an intermediate space for accommodating a ring seal is provided between an end face of the central body and an end face of the annular piston which faces the central body.

10. A hydraulic brake system according to claim 1, wherein the central body is provided with at least one aperture in a direction of movement of the annular piston, with said aperture producing a permanent pressure medium connection between the main pressure line that originates at the brake pressure transducer and an intermediate space that accommodates a ring seal.

11. A hydraulic brake system according to claim 1, wherein the annular piston is provided with a collar that, in the first position, is biased against a bore step of the annular space and is supported by a compression spring engaging the magnetic core.

12. A hydraulic brake system according to claim 1, wherein a notch on the end face of the annular piston serves as the pressure medium passage when the annular piston is in the second position.

* * * * *